:::
United States Patent Office 3,271,256
Patented Sept. 6, 1966

3,271,256
CHLOROFORM IN HARD CANDY
Robert R. Frey, Greensboro, N.C., assignor to Richardson-Merrell Inc., New York, N.Y., a corporation of Delaware
No Drawing. Filed Mar. 21, 1963, Ser. No. 266,799
15 Claims. (Cl. 167—82)

This invention relates to solid therapeutic dosage forms for oral administration. In particular, it relates to hard candy containing chloroform and to a method of incorporating chloroform in hard candy.

The desirability of incorporating chloroform in hard candy and the like for treatment of the mucosa of the mouth and throat has been appreciated for many years. Chloroform has a number of desirable therapeutic and organoleptic properties which include local anesthetic, antitussive, and other therapeutic activities and in addition, it gives a feeling of strength and subjective potency to the medication which is difficult, if not impossible, to duplicate. Unfortunately, up to the present time the incorporation of chloroform in hard candy, such as cough drops, has not been possible, and the available products containing chloroform are syrups, pressed tablets, or lozenges usually made by adding chloroform to a sugar-gum paste and drying the product slowly at low temperatures. The loss of chloroform during the drying operation and on prolonged storage is extremely high because of the porous structure of these products. In addition, these quickly disintegratable forms of medication are not considered to be as desirable as is hard candy.

It has not heretofore been possible to incorporate effective amounts of chloroform in hard candy. Hard candy is made by cooking sucrose and corn syrup at relatively high temperatures and then cooling the plastic mass and forming it into shapes at about 210° F. Obviously the highly volatile chloroform which boils at 140° F. cannot be incorporated in the candy at these high temperatures.

Normally, hard candy consists primarily of amorphous sucrose containing sufficient corn syrup solids and/or invert sugar to prevent the sucrose from crystallizing. The molecules of the mixed sugars are fused together in a disorganized pattern to form the amorphous mass. If, however, the sucrose molecules should gain sufficient mobility by an increase of moisture in the candy, then the sucrose could orient into an organized molecular pattern which is crystalline. The mass becomes progressively softer, more friable, and more opaque. It has been found, however, that stable amorphous hard candy can be produced if the initial moisture content is not allowed to exceed approximately 3 percent by weight of water.

Although hard candy can be plasticized with water to lower the temperature at which it may be worked, to incorporate flavors, colors, medicaments of various kinds, and chloroform, a normal candy base must have approximately 4½ to 5 percent of water to reduce its working temperature to the boiling point of chloroform, 140° F. Hard candy with this amount of water will crystallize spontaneously when cooled unless a high ratio of corn syrup solids and/or invert sugar to sucrose is used. When such high amounts of corn syrup solids and/or invert sugar are used to prevent crystallization, the candy is sticky and extremely hygroscopic. As a result it is not practical to use more than about 3 percent of water as the sole plasticizer for hard candy because it is not possible to obtain a product which is sufficiently stable for commercial production and sale.

Various nontoxic polyhydroxy compounds such as propylene glycol and glycerol have been added to hard candy to lower its melting point and ensure maintenance of the amorphous solid state. Glycerine and propylene glycol are, however, hygroscopic and when enough of these materials are used to lower the working temperature of the candy to below 140° F., the resulting hard candy is extremely hygroscopic even when 3 percent of water is also added to augment the plasticizing action of these polyhydroxy compounds.

Although the three most effective plasticizers of hard candy—water, glycerol, and propylene glycol—can be combined to reduce the working temperature of cooked hard candy to below the boiling point of chloroform, it is not possible to produce satisfactory, stable chloroform-containing candy by this means. I have discovered, however, that by using nonhygroscopic polyethylene glycols, it is possible to provide conditions under which chloroform can be incorporated in hard candy. The mechanisms of the actions of the nonhygroscopic polyethylene glycols is not clearly understood, but their use does have definite and desirable effects.

The nonhygroscopic polyethylene glycols raise the surface tension and increase the viscosity of solutions of chloroform. The rate of evaporation is markedly retarded. For example, 100 milliliters of chloroform in an open beaker was 50 percent evaporated in three hours at 140° F. whereas it required seven hours to evaporate 50 percent of the chloroform in a beaker under the same conditions when the solution contained 100 grams of polyethylene glycol of average molecular weight between 3000 and 3700. The polar characteristics of chloroform make it possible that a molecular attraction between its acidic hydrogen and the ether linkages of the polyethylene glycol results in complex formation. This may explain the increase in viscosity and lower rate of evaporation.

A distinctly different aspect of the present invention, which makes it possible to incorporate adequate amounts of chloroform in the hard candy, resides in the manner in which the chloroform is worked into the candy. I have discovered that if the candy is pulled, as on a taffy-pulling machine, while a solution of chloroform and nonhygroscopic polyethylene glycol is poured over its surface, a product is obtained having a cellular structure which is capable of holding large amounts of chloroform. At the same time, the cooled candy is hard, stable, and relatively nonhygroscopic. It can be formed into shapes such as cough drops, packaged and stored without difficulty.

In order that the present invention may be more clearly understood, a preferred example of incorporating chloroform in hard candy will be given.

| | Pounds |
|---|---|
| Sucrose | 49 |
| Corn syrup (43° Baumé; 36 DE) | 49 |
| Polyethylene glycol (molecular weight 3000 to 3700) | 8 |
| Propylene glycol | 2 |

These ingredients are dissolved with the necessary amount of water.

The resulting solution is heated to about 268° F. and then placed under vacuum to remove water down to about 3 percent moisture. The cooked candy, after being under a vacuum of twenty inches, thereby reaching a temperature of about 220° F., is placed on a mixing and cooling slab. Coloring and flavoring materials as well as therapeutic agents which are stable at 220° F. may then be worked into the candy mass as in conventional candy-making procedures.

When the candy mass has cooled to about 140° F., it is transferred to a taffy-pulling machine. When the plastic candy mass is properly distributed on the pulling hooks, the machine is started and a solution of 300 grams of polyethylene glycol (having a molecular weight distribution between 3000 and 3700) in 300 milliliters of U.S.P. chloroform is slowly poured over the candy while it is being worked. Additional flavoring agents may be incorporated at this stage of the process, if desired. After pulling the candy for about two and one-half minutes, it is transferred to a batch former and from there to a rope former and a drop cooling line as in conventional cough drop making procedures.

A more highly medicated cough drop having a germicide, an antitussive agent, and a local anesthetic, in addition to chloroform, may be prepared as follows:

| | |
|---|---|
| Granulated sugar | pounds__ 25 |
| Corn syrup (43° Baumé; 36 DE) | do____ 25 |
| Water | gallon__ 1 | is heated to boiling and

| | Pounds |
|---|---|
| Propylene glycol, N.F. | 1 |
| Nonhygroscopic polyethylene glycol (molecular weight 3000 to 3700) | 3.4 |
| Color | 0.3 | is added and the mixture transferred to a candy cooker. The solution is heated to 268° F. and then transferred to a vacuum kettle where it is cooled for one minute under a vacuum of twenty inches. The plastic candy mass is transferred to a mixing slab and the following active medication is added:

| | Pound |
|---|---|
| Antitussive | 0.2 |
| Local anesthetic | 0.1 |

When the candy mass has cooled to about 140° F., it is then transferred to a pulling machine as described above and the following solution is added while pulling:

| | Pound |
|---|---|
| Polyethylene glycol, 4000 U.S.P. (molecular weight 3000 to 3700) | 0.6 |
| Chloroform, U.S.P. | 0.6 |
| Flavors | 0.2 |

The candy is pulled for about two and one-half minutes and transferred to the usual forming equipment and formed into cough drops as in conventional practice.

The proportions of sugar, corn syrup, invert syrup, water, flavoring, coloring, and medicinal agents will, generally speaking, remain the same when practicing the present invention as when preparing medicated hard candy as now practiced in the art. The amount of sucrose may vary from about 35 percent to 92 percent, and the corn syrup or invert sugar or mixtures of these two may make up the remaining saccharides of the candy-forming components. It is preferred that the moisture content of the cooked candy be from 2.75 percent to 3.5 percent. Lower amounts of moisture down to 0.5 percent or amounts as high as 5.0 percent can be used under particular conditions. A second plasticizer, in addition to water, can be glycerol, propylene glycol, sorbitol, or other nontoxic polyhydroxy candy plasticizers such as the low molecular weight polyethylene glycols.

Since the plasticizing effect is best with the lowest molecular weight polyethylene glycols, smaller amounts of these lower molecuar weight products are necessary than when using those having a larger molecule. Unfortunately, however, the hygroscopicity is greatest with the lowest molecular weight polyethylene glycols and, like the other plasticizers such as glycol, propylene glycol, and sorbitol, only small amounts of these can be used if undesirable hygroscopicity in the finished candy is to be avoided. In general, it may be stated that hygroscopic polyethylene glycols may be used in amounts ranging from 1 to 10 percent of the candy formulation whereas the higher molecular weight polyethylene glycols may be used in amounts up to 20 percent of the total weight of the candy. Other hygroscopic candy plasticizers may be used in amounts of 1 to 10 percent by weight.

As will be apparent from the foregoing examples, most of the plasticizers are incorporated in the candy before it is cooked. However, amounts of plasticizers may be added on the cooling and mixing slab while the candy is still plastic enough to be worked. Although it is possible to add all of the chloroform on the candy pulling machine without the modifying action of the nonhygroscopic polyethylene glycols, it is highly desirable that the chloroform has dissolved in enough of these nonhygroscopic polyethylene glycols to increase the viscosity of the solution so that it will more readily cling to the candy as it is being worked and also that the rate of evaporation of the chloroform be retarded. The chloroform solutions should therefore have as much of the high molecular weight polyethylene glycols dissolved therein as possible while still maintaining the solution in a readily pourable consistency. As noted from the specific examples, it is preferred that the chloroform/polyethylene glycol solution contains approximately 1.5 parts of chloroform by weight plus approximately 1 part of polyethylene glycol by weight. Amounts of these solutions may be mixed with the candy so as to provide up to 5 percent by weight of chloroform, which means that when considering loss by spillage and evaporation, approximately 16 percent by weight of polyethylene glycol-modified chloroform solution is added to the candy while it is being pulled.

Although the best temperature range for pulling the candy is slightly below the boiling point of chloroform, 135° F. to 140° F., it is possible to incorporate the chloroform in the candy at temperatures within the range of 120° F. and 165° F.

What is claimed is:

1. A method of incorporating chloroform in hard candy which comprises the steps of preparing a plastic mass of hard candy at a temperature above the boiling point of chloroform containing plasticizers comprising from 0.5 percent to 5.0 percent of water and 5 to 20 percent by weight of a nonhygroscopic polyethylene glycol; then working chloroform into said plastic candy mass at temperatures within the range of 120° F to 165° F.

2. A method in accordance with claim 1 in which the chloroform is worked into said plastic candy mass while pulling said candy.

3. A method of incorporating chloroform in hard candy which comprises the steps of preparing a plastic mass of hard candy at a temperature above the boiling point of chloroform containing plasticizers comprising from 0.5 percent to 5.0 percent of water, from 1 to 10 percent of a nontoxic polyhydroxy plasticizer for hard candy, and 5 to 20 percent by weight of a nonhygroscopic polyethylene glycol; then working chloroform into said plastic candy mass at temperatures within the range of 120° F. to 165° F. and thereafter forming the candy into desired shapes and cooling.

4. A method of incorporating chloroform in hard candy which comprises the steps of preparing a plastic mass of hard candy at a temperature above the boiling point of chloroform containing plasticizers comprising from 0.5 percent to 5.0 percent of water, from 1 to 10 percent of a nontoxic plasticizer for hard candy, and up to 20 percent by weight of a nonhygroscopic polyethylene glycol; then working a solution of chloroform and a polyethylene glycol having an average molecular weight within the range of 3,000 to 20,000 into said plastic candy mass at temperatures within the range of 120° F. to 165° F.

5. A method of incorporating chloroform in hard candy which comprises the steps of preparing a plastic mass of hard candy at a temperature above the boiling point of chloroform containing plasticizers comprising from 0.5 percent to 5.0 percent of water, from 1 to 10 percent of a nontoxic polyhydroxy plasticizer for hard candy, and up to 20 percent by weight of a nonhygroscopic polyethylene glycol; then working a solution of chloroform and a polyethylene glycol having an average molecular weight within the range of 3,000 to 20,000 into said plastic candy mass at temperatures within the range of 120° F. to 165° F.

6. A method of incorporating chloroform in hard candy which comprises the steps of preparing a plastic mass of hard candy at a temperature above the boiling point of chloroform containing plasticizers comprising from 0.5 percent to 5.0 percent of water, from 1 to 10 percent of glycerol, and 5 to 20 percent by weight of a nonhygroscopic polyethylene glycol; then working a solution of chloroform containing polyethylene glycol having a molecular weight within the range 3,000 to 20,000 into said plastic candy mass at temperatures within the range of 120° F. to 165° F. and thereafter forming the candy into desired shapes and cooling.

7. A method of incorporating chloroform in hard candy which comprises the steps of preparing a plastic mass of hard candy at a temperature above the boiling point of chloroform containing plasticizers comprising from 0.5 percent to 5.0 percent of water, from 1 to 10 percent of propylene glycol, and 5 to 20 percent by weight of a non-hygroscopic polyethylene glycol; then working a solution of chloroform containing polyethylene glycol having a molecular weight within the range 3,000 to 20,000 into said plastic candy mass at temperatures within the range of 120° F. to 165° F. and thereafter forming the candy into desired shapes and cooling.

8. A method of incorporating chloroform in hard candy which comprises the steps of preparing a plastic mass of hard candy at a temperature above the boiling point of chloroform containing plasticizers comprising from 0.5 percent to 5.0 percent of water, from 1 to 10 percent of sorbitol, and 5 to 20 percent by weight of a nonhygroscopic polyethylene glycol; then working a solution of chloroform containing polyethylene glycol having a molecular weight within the range 3,000 to 20,000 into said plastic candy mass at temperatures within the range of 120° F. to 165° F. and thereafter forming the candy into desired shapes and cooling.

9. A method of incorporating chloroform in hard candy which comprises the steps of preparing a plastic mass of hard candy at a temperature above the boiling point of chloroform containing plasticizers comprising from 0.5 percent to 5.0 percent of water, from 1 to 10 percent of polyethylene glycol having a molecular weight of less than 3,000, and 5 to 20 percent by weight of a nonhygroscopic polyethylene glycol; then working a solution of chloroform containing polyethylene glycol having a molecular weight within the range 3,000 to 20,000 into said plastic candy mass at temperatures within the range of 120° F. to 165° F. and thereafter forming the candy into desired shapes and cooling.

10. A method of incorporating chloroform in hard candy which comprises the steps of preparing a plastic mass of hard candy at a temperature of about 200 to 220° F., the said candy mass containing 2.5 to 3.5 percent by weight of water, 1 to 10 percent by weight of a nontoxic, hygroscopic polyhydroxy plasticizer for hard candy, and 5 to 20 percent by weight of a polyethylene glycol having a molecular weight in excess of 3,000, mixing medicaments and flavoring agents in the said plastic candy mass, reducing the temperature to about 135 to 140° F., transferring said candy mass to a candy pulling machine and pouring over the surface of said plastic candy mass a solution of chloroform containing a polyethylene glycol having a molecular weight in excess of 3,000 whereby said chloroform solution is incorporated in the resulting candy mass.

11. A hard candy having a cellular structure and containing 0.05 to 5.0 percent by weight of chloroform, said candy having 0.5 to 5.0 percent by weight of water and 5 to 20 percent by weight of a nontoxic, nonhygroscopic polyethylene glycol having a molecular weight in excess of 3,000.

12. A hard candy having a cellular structure and containing 0.05 to 5.0 percent by weight of chloroform, said candy having 0.5 to 5.0 percent by weight of water, 1 to 10 percent by weight of a polyethylene glycol of molecular weight of less than 3,000, and 5 to 20 percent by weight of a nontoxic, nonhygroscopic polyethylene glycol having a molecular weight in excess of 3,000.

13. A hard candy having a cellular structure and containing 0.05 to 5.0 percent by weight of chloroform, said candy having 0.5 to 5.0 percent by weight of water, 1 to 5 percent by weight of glycerol, and 5 to 20 percent by weight of a nontoxic, nonhygroscopic polyethylene glycol having a molecular weight in excess of 3,000.

14. A hard candy having a cellular structure and containing 0.05 to 5.0 percent by weight of chloroform, said candy having 0.5 to 5.0 percent by weight of water, 1 to 5 percent by weight of propylene glycol, and 5 to 20 percent by weight of a nontoxic, nonhygroscopic polyethylene glycol having a molecular weight in excess of 3,000.

15. A hard candy having a cellular structure and containing 0.05 to 5.0 percent by weight of chloroform, said candy having 0.5 to 5.0 percent by weight of water, 1 to 10 percent by weight of sorbitol, and 5 to 20 percent by weight of a nontoxic, nonhygroscopic polyethylene glycol having a molecular weight in excess of 3,000.

References Cited by the Examiner

UNITED STATES PATENTS

| | | | |
|---|---|---|---|
| 2,325,529 | 7/1943 | Merrill | 167—82 X |
| 2,963,404 | 12/1960 | Hammer et al. | 167—82 |
| 2,970,919 | 2/1961 | Perry | 99—134 |

OTHER REFERENCES

Pharmaceutical Formulas, The Chemist and Druggist, London, England, 1953, vol. I page 814.

JULIAN S. LEVITT, *Primary Examiner.*

FRANK CACCIAPAGLIA, JR., *Examiner.*

GEORGE A. MENTIS, *Assistant Examiner.*